United States Patent
Khanduri et al.

(10) Patent No.: US 8,774,399 B2
(45) Date of Patent: Jul. 8, 2014

(54) SYSTEM FOR REDUCING SPEAKERPHONE ECHO

(75) Inventors: Prakash C. Khanduri, Freehold, NJ (US); Bosen Zhao, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 159 days.

(21) Appl. No.: 13/337,423

(22) Filed: Dec. 27, 2011

(65) Prior Publication Data

US 2013/0163748 A1    Jun. 27, 2013

(51) Int. Cl.
*H04M 9/08*    (2006.01)
(52) U.S. Cl.
USPC ................................. 379/406.08; 379/406.05
(58) Field of Classification Search
USPC ........................................ 379/406.01–406.16
See application file for complete search history.

(56) References Cited

U.S. PATENT DOCUMENTS

| | | | | |
|---|---|---|---|---|
| 5,668,794 A * | 9/1997 | McCaslin et al. | | 370/288 |
| 5,692,042 A * | 11/1997 | Sacca | | 379/390.01 |
| 5,896,461 A * | 4/1999 | Faraci et al. | | 381/386 |
| 7,564,981 B2 * | 7/2009 | Croft, III | | 381/77 |
| 7,593,535 B2 * | 9/2009 | Shmunk | | 381/94.9 |
| 2002/0181698 A1 * | 12/2002 | Takahashi et al. | | 379/406.01 |
| 2013/0003960 A1 * | 1/2013 | Sollenberger et al. | | 379/406.01 |

* cited by examiner

*Primary Examiner* — Simon Sing
(74) *Attorney, Agent, or Firm* — Brinks Gilson & Lione

(57) ABSTRACT

A telecommunication system including a speakerphone provides a coupled signal path, including a microphone, configured to sense an incoming audio signal and an echo signal and generate a coupled signal. The echo signal includes non-linear distortion generated by a speaker of the speakerphone. An echo signal path, including an amplifier, is configured to sense the echo signal and generate an echo reference signal. The echo reference signal includes the non-linear distortion. An acoustic echo canceller is configured to receive the coupled signal from the coupled signal path, to receive the echo reference signal from the echo signal path, and to cancel out the non-linear distortion included in the coupled signal based on the non-linear distortion included in the echo reference signal.

19 Claims, 6 Drawing Sheets

US 8,774,399 B2

SYSTEM FOR REDUCING SPEAKERPHONE ECHO

TECHNICAL FIELD

This disclosure relates generally to the design of a full duplex speakerphone to be used in telecommunication systems including stationary applications, e.g., conference speaker phones, and mobile applications, e.g., cellular phones, handset phones and handheld personal digital assistants (PDAs).

BACKGROUND

Telecommunication systems can be capable of operating in a speaker mode in which data is broadcast through the speakers, or in a handset mode in which data is output through an ear piece in the telecommunication system. Audio quality in telecommunication systems, especially in the speaker mode, is a feature that can receive high consideration by customers. Audio quality in the speaker mode can be affected by distortion and echo propagating between the broadcasting speakers and microphones which are co-located on the telecommunication systems. Acoustic echo can arise when sound from the speaker, for example, the earpiece of a telephone handset, is picked up by the microphone. Such echo can also occur in any communications scenario where there is a speaker and a microphone. Distortion can occur by overdriving the loudspeaker or physical coupling of vibrations from the loudspeaker to the microphone through the telephone. Acoustic echo and distortion during a conversation can be distracting to call participants.

BRIEF DESCRIPTION OF THE DRAWINGS

The system may be better understood with reference to the following drawings and description. In the figures, like reference numerals designate corresponding parts throughout the different views.

DETAILED DESCRIPTION

The following disclosure discusses a full duplex speakerphone, including for smaller form factor mobile handsets. The disclosed systems and methods can include an advantage over conventional acoustic echo cancellation (AEC) techniques which in some instances may be limited due to poorly designed acoustics, less efficient components and distortion in the echo path due to loudspeaker or other transducer overdriving. The disclosed systems and methods can use hardware to estimate and reduce acoustic echo and/or speaker or earpiece distortion, such as caused by speaker overdriving or physical coupling, e.g., vibrations of the loudspeaker that transfer to the microphone via a handset casing. The systems and methods may be used for various applications such as hands-free car phone systems, standard telephones or cellphones in speakerphone or hands-free mode, dedicated standalone conference phones, and installed room systems which use ceiling speakers and microphones on the table. The disclosed systems and methods can also help in systems having small loudspeakers that when overdriven easily go into saturation to create non-linear sounds which can be difficult for the echo cancellers to handle.

Figure 1:
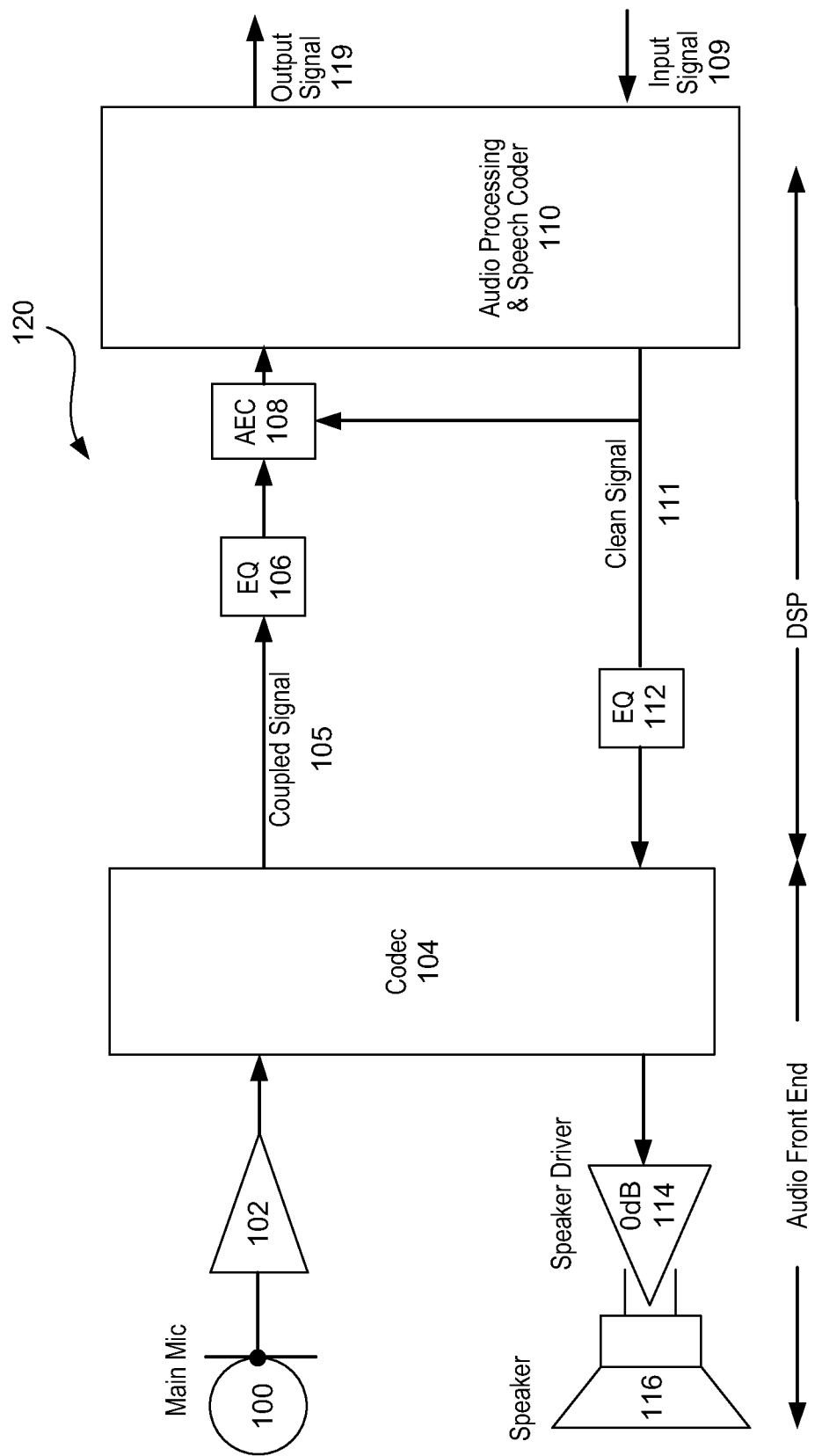
FIG. 1 is a block diagram of a telecommunications system operating in speaker mode.

FIG. 1 is a block diagram of a full duplex telecommunications system 120 operating in speaker mode. For speech broadcast, the telecommunications system 120 receives an input signal 109, including audio content, from a communications link (e.g. phone line, or mobile) that is to be broadcast through the speakers 116. Based on the input signal 109, audio processing and speech coder (speech coder) 110, or other digital signal processor (DSP) generates a clean signal 111 including the audio content to be broadcast. The clean signal 111 is substantially devoid of any distortion or noise from subsequent processing or the local environment. This is because the speech coder 110 generates the clean signal 111 without any prior knowledge of non-linear distortion that is generated by driver amplifier 114 and/or the speakers 116. The clean signal 111 can be further processed by codec 104 which may include some signal processing blocks such as mixer or equalizer 112 before being provided to speaker driver 114. Some non-linearity may be added to the clean signal 111 prior to being played by speaker 116. An exemplary CODEC is model number BCM21553 manufactured by Broadcom Corporation.

For signal/speech reception, system 120 includes a microphone 100, programmable gain amplifier 102, codec 104, equalizer 106, active acoustic echo canceller (AEC) 108, and the speech coder 110. During speech reception, main microphone 100 captures an incoming audio signal (e.g. speech) that is amplified by programmable gain amplifier (PGA) 102, and then processed by codec 104 to produce a coupled signal 105 that is equalized by equalizer 106. The PGA 102 may provide gain from about −0 dB to about 42 dB. The output of equalizer 106 is provided to the AEC 108 in addition to the clean signal 111 that represents any co-existing broadcast from speaker 116. The output of the AEC 108 is provided to the speech coder 110, which then produces an output signal 119 to be provided to the communications link (e.g. phone line, or mobile).

Some measure of any broadcast output from speaker 116 will be undesirably picked-up by the main microphone 100. However, since the clean signal 111 is known, then the AEC 108 can cancel the clean signal 111 content from coupled signal 105, to at least partially mitigate this effect. The AEC 108 can include a least mean square (LMS) or other type of adaptive filter based echo canceller.

However, in the speaker phone mode (as opposed to the handset mode), the speakers 116 of a telecommunication system, shown in FIG. 1, can be over-driven by speaker driver 114 forcing the speakers 116 to enter and operate in their saturation regions, which is turn leads to the generation of non-linear harmonics and distortion. This non-linear distortion is picked up or sensed by the main microphone 100 of the telecommunication system along with desired audio and background noise, and is therefore included in the coupled signal 105.

The AEC 108 attempts to model and cancel-out the non-linear distortion included in the coupled signal 105 based on the clean signal 111 received from the speech coder 110. However, the speech coder 110 generates the clean signal 111 based on input signal 109 by running algorithms which do not account for the non-linear distortion included in the coupled signal 105. That is, the speech coder 110 generates the clean signal 111 without any prior knowledge of the non-linear distortion, occurring due to the over-driven speakers, included in the coupled signal. As such, the clean signal 111 may not enable the AEC 108 to identify the non-linearities which are responsible for the non-linear distortion. The AEC 108 may not be able to accurately model and cancel out the non-linear distortion. Therefore, the AEC 108 may attempt to use non-linear processing to model the distortion, which may produce poor duplex audio performance in speaker phone mode of the telecommunication system.

Figure 2:
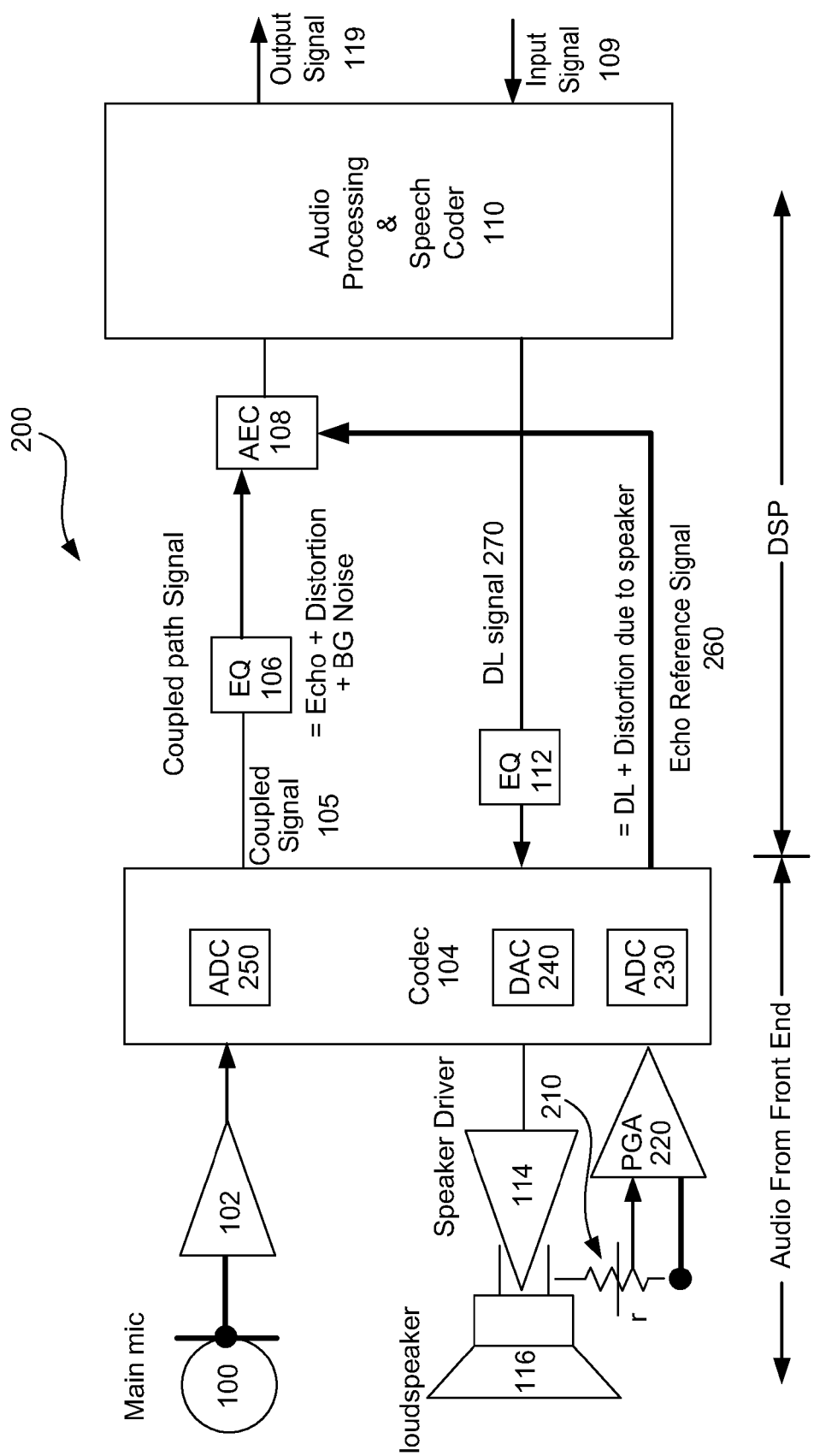
FIG. 2 is a block diagram of a telecommunications system operating in speaker mode.

FIG. 2 is a block diagram of a full duplex telecommunications system 200 operating in speaker mode. In addition to the components of the system 120 described in FIG. 1, the system 200 can include a resister 210 and programmable gain amplifier (PGA) 220. The resister 210 can include a resister ladder to provide variable resistance and the PGA 220 can include other amplifiers, such as non-programmable gain amplifiers. The register 210 and PGA 220 can allow a resistive change value form about 1 ohm to about 0.1 ohms. The resistances can be set depending upon an implementation, such as prior to delivering the system to a customer. The PGA 220 may provide gain from about −0 dB to about −20 dB.

The PGA 220 connects with analog to digital converter (ADC) 230, such as an available ADC on CODEC 104 or another ADC. The CODEC 104 can also include digital to analog converter (DAC) 240 which connects EQ 112 with the speaker driver 114, and ADC 250 which connects PGA 102 to EQ 106. In this way, incoming analog signals can be converted to digital signal for processing by the speech coder 110, and processed digital signals from the speech coder 110 can be outputted as analog signals to the loudspeaker 116. Different types of loudspeakers and speaker drivers can be used. For example, in an integrated hands-free speakerphone architecture the speaker driver can include a class D amplifier and the loudspeaker 116 can include a speakerphone loudspeaker, and for a handset architecture the loudspeaker 114 can include a class AB amplifier and the loudspeaker 116 can include an HS/HD loudspeaker.

The resister 210 and the PGA 220 can operate with various loudspeaker/speaker driver combinations to feed an echo reference signal 260 from the loudspeaker 116 to the speech coder 110. By being attached to the loudspeaker 116, the echo reference signal 260 can include the down link (DL) signal 270 sent to the speaker driver 114 from the communication networks plus any distortion due to the loudspeaker 116, including distortion from a signal drive level of the loudspeaker 116. Both the coupled signal 105 and the echo reference signal 260 are sent to the AEC 108 before being inputted to the speech coder 110.

Using the echo reference signal 260 as an echo and distortion reference, the AEC 108 can remove DL noise, echo and distortion from the coupled signal 105. The AEC 108 can take the echo reference signal 260 and use it to subtract out at least some of the non-linear distortion included in the coupled signal 105. The subtracting operation can include at least one of introducing a delay in at least a part of the echo reference signal 260, inverting a phase of the echo reference signal 260, and regulating an amplitude of the echo reference signal 260. Since the echo reference signal 260 can provide information about speaker distortion, there may be no need to try to model the distortion at the AEC 108 because the distortion is being fed back to the AEC 108. In addition, existing AEC algorithms can be used with little or no modification. Feeding the echo reference signal 260 back to the AEC 108 can allow for non-linear distortion and noise to be handled by the system 200 in a linear way. Echo cancelling at AEC 108 can also converge faster and model the echo path more rapidly. Therefore, rapid echo cancellation and full duplex performance can be possible by adding the PGA 220 or other similar hardware to the system 200. This approach can further simplify the audio control and make other operations simpler. With the use of hardware to pick speaker distortion, the system 200 can allow estimation of distortion caused by the loudspeaker 116 overdriving, and echo can be canceled more effectively, e.g., there can be less echo residual in the system 200.

Figure 3:
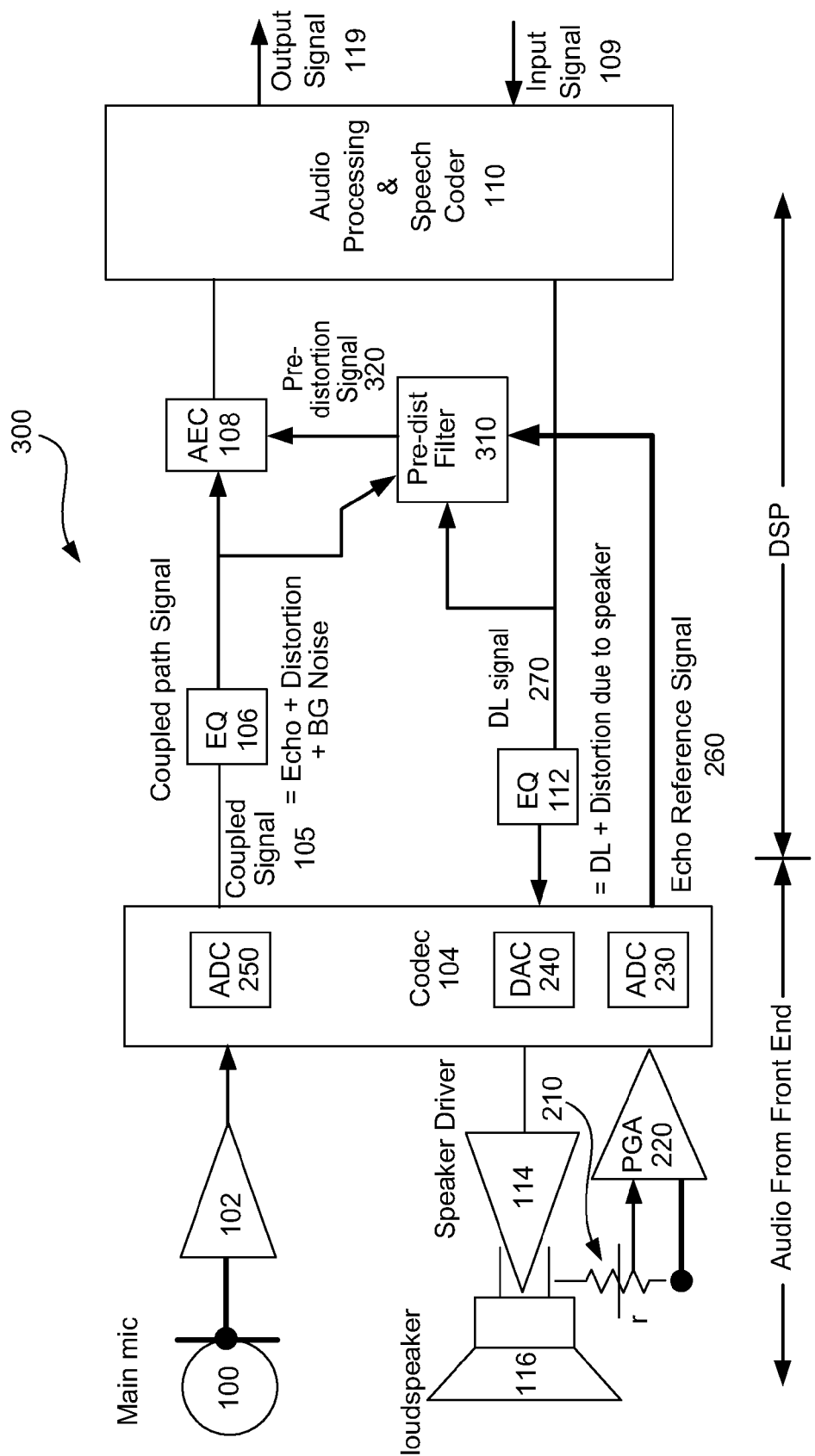
FIG. 3 is a block diagram of a telecommunications system operating in speaker mode.

FIG. 3 is a block diagram of a full duplex telecommunications system 300 operating in speakerphone mode. In this example the system 300 includes a pre-distortion filter 310 connected to the AEC 108 to pre-distort echo cancelling reference signals for processing by the AEC 108. The pre-distortion filter 310, or other adaptive type filter, can receive the coupled signal 105 inputted at the microphone 100, the echo reference signal 260 returned from the loudspeaker 116 and the DL signal 270 received from the communications network to help determine echo path distortion. The coupled signal 105 which can include echo, distortion and BG noise (background noise), minus the echo reference signal 260 and the DL signal 270, can be used by the pre-distortion filter 310 to pre-distort echo reference signal 320 to the AEC 108 to further enhance AEC performance. This can allow the AEC 108 to better model echo precisely in enhancing the non-linear echo canceller performance, such as if there is non-linearity caused by plastic vibrations.

Figure 4:
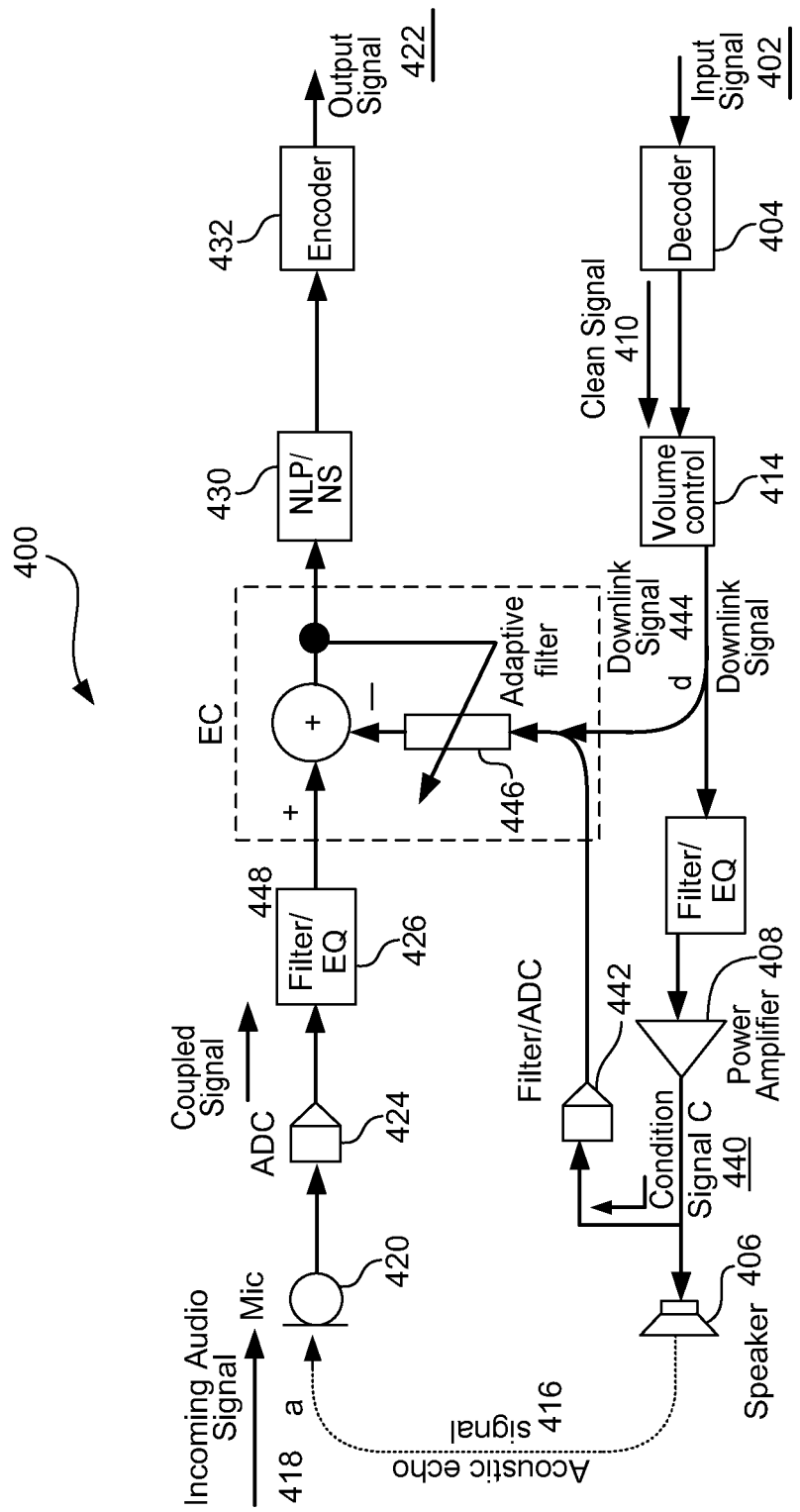
FIG. 4 is a block diagram of a telecommunications system operating in a speaker mode and illustrating exemplary audio signal paths.

FIG. 4 is a block diagram showing exemplary audio signal paths in a device 400 such as a mobile device. An input signal 402, such as an audio data signal received from the communications network, can be decoded at decoder 404 for output by the speaker 406 or other transducer. The speaker can be driven by a power amplifier 408. Before being provided to the power amplifier 408, a clean signal output by the decoder 404 can be further processed by filter/equalizer 412 and the volume can be controlled by volume control 414.

An acoustic echo signal (a) 416 may travel from the speaker 406 to a microphone 420 and be combined with an incoming audio signal 418, such as incoming speech or no incoming signal, at the microphone 420. Before being passed to the communications network as output signal 422, signals from the microphone 420 can be processed by one or more of an analog-to-digital converter (ADC) 424, a filter/equalizer 426, an echo canceller (EC) 428, a nonlinear processor/noise suppressor (NLP/NS) 430 and encoder 432. To aid with echo cancellation, a condition signal (c) 440, such as the echo reference signal 260 in FIGS. 2 and 3, can be sent to the echo canceller 428 via filter/ADC 442. The condition signal (c) 440 originates from the speaker 406 and therefore can cause distortion at the speaker 406 due to an overdriving loudspeaker. An adaptive filter 446 can take the condition signal (c) 440, model the echo path and then subtract it from the coupled signal 448, including the acoustic echo signal 418 and the incoming audio signal 418 received at the microphone 420.

Without the adaptive filter 446, mobile phones in a high volume (big loudness) speaker mode, can otherwise be a challenge to echo cancellation. In some cases, the microphone 420 picks-up of the speaker acoustic echo signal (a) 416 from an echo path about 2 cm to 10 cm from the speaker 406 to the microphone 420, depending on a model of the phone. Using the adaptive filter 446 the echo canceller 428 can cancel the linear part of echo signals while NLP/NS 430 can suppress the echo residuals outputted from the echo canceller 428 output.

The linear part of the echo signals includes the downlink signals (d) 444 in the audio path. The downlink signal (d) 444 can be input to the adaptive filter 446 to correlate with the echo signal for its cancellation. It can be common in mobile phones that the signal picked up by the microphone 420 is highly distorted from the downlink signal (d) 444, such as due to speaker-overdriving by high volume requirements. As such, the microphone pick-up signal can include components uncorrelated with the downlink signal (d) 444 which may not be cancelled by the echo canceller 428. Strong echo residuals can be pushed to the NLP/NS 430 which the NLP/NS 430 may suppress using high gains. However, double-talk performance can be compromised by imposing high NLP gains. Therefore, the condition signal (c) 440 is input to the echo canceller 428 to represent the real output signal condition of interaction between the speaker 406 and the power amplifier 408. The condition signal (c) 440 can closely correlate to the speaker acoustic signal to provide for more effective echo cancellation, such as measured by ERLE (echo return loss enhancement), than if the condition signal (c) 440 were not input. Therefore, the echo canceller 428 can cancel most of the echo signal and leave less signal residual for the NLP/NS 430 to handle.

Figure 5:
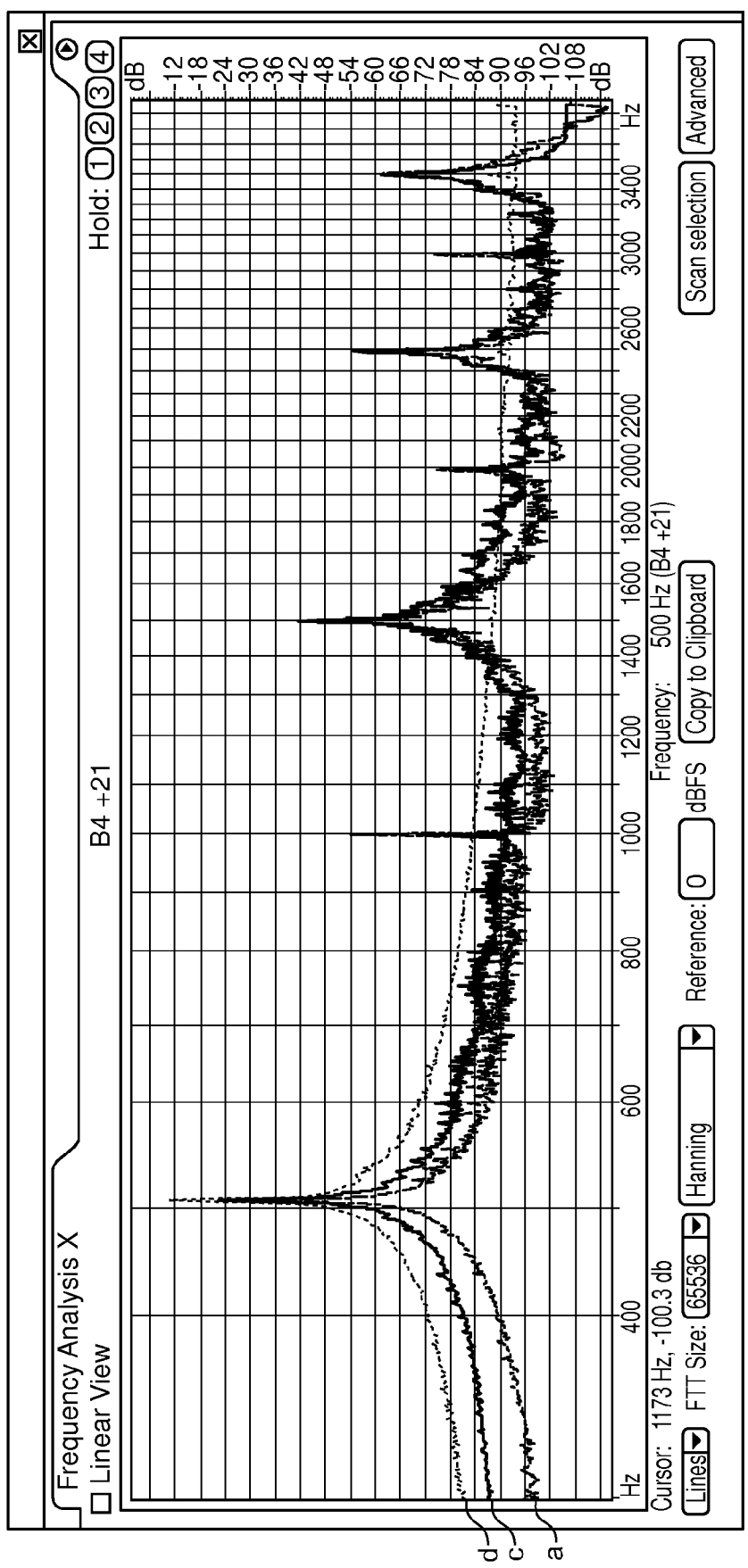
FIG. 5 is a graph of a spectrum analysis of signals of FIG. 4.

FIG. 5 is a graph of a typical spectrum analysis illustrating the signals of FIG. 4. The downlink signal (d) 444 is a digital signal and has no interaction with the speaker 406 or other transducer. The condition signal (c) 440 is an analog condition signal output by the power amplifier 408 and having interaction information between the speaker 406 and the power amplifier 408. The acoustic echo signal (a) 416 can travel between the speaker 406 and the microphone 420. In mobile phone applications a distance of the acoustic path between the speaker 406 and microphone 420 can be from about 2 cm to 10 cm, which can translate into a time delay of about 0.06 ms to 0.3 ms from the speaker 406 to the microphone 420. As illustrated by this spectrum analysis, there can be a high correlation between the condition signal (c) 440 and the acoustic echo signal (a). Therefore, reducing the coupled signal 448 by the condition signal (c) 440 can aid in cancelling the acoustic echo signal 416 or other distortion from the coupled signal 448. This can make it easier for the echo canceller 428 to perform echo cancellation and there can be less need to rely on the NLP/NS 430 for cancellation of unwanted echo, distortion and/or noise.

Figure 6:
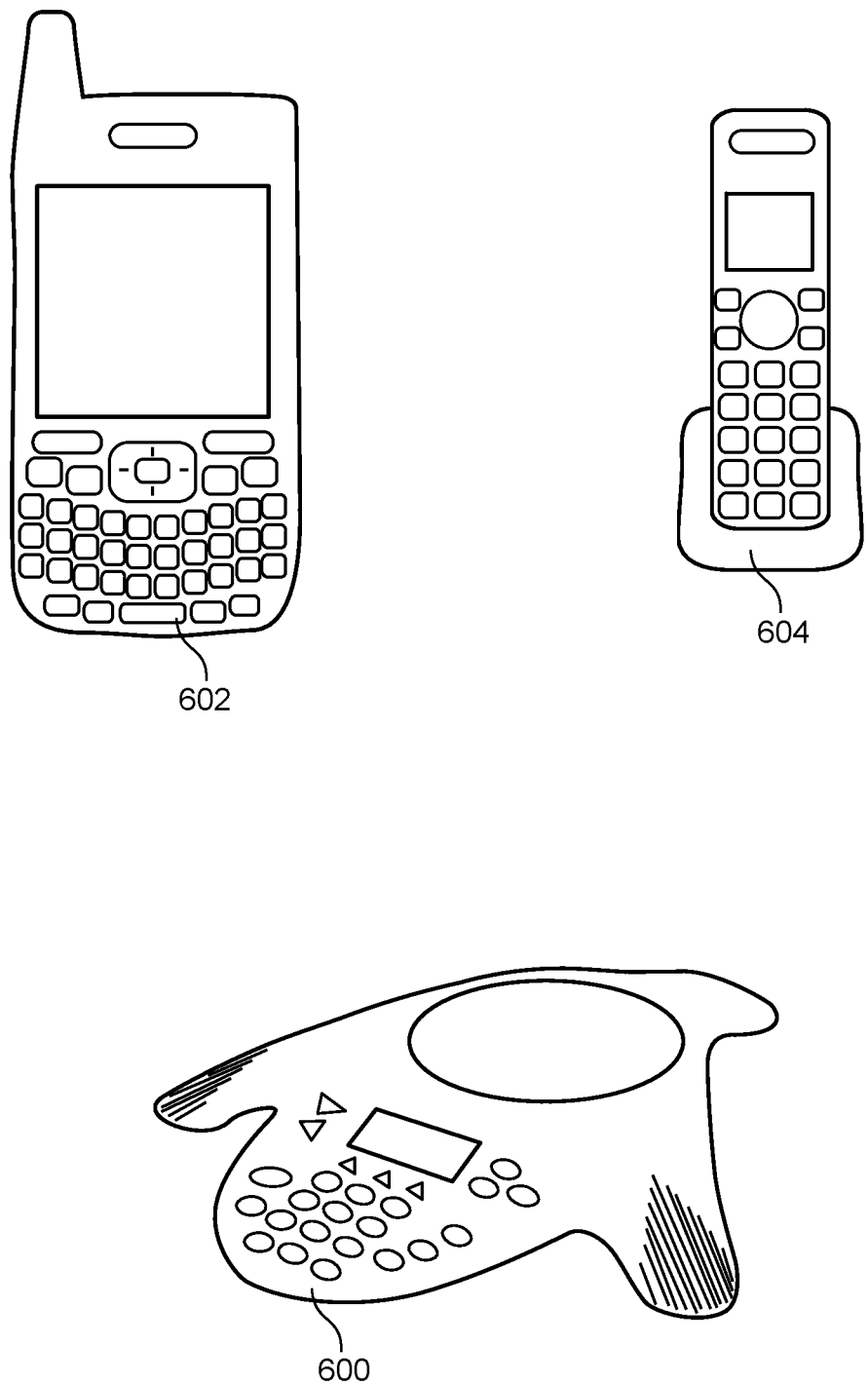
FIG. 6 is a diagram of exemplary telecommunication systems which can utilize the full duplex speakerphone.

FIG. 6 illustrates some exemplary telecommunication systems 600, 602, 604 which can utilize the full duplex speakerphone according to the echo cancelling systems and methods. Benefits of the systems and methods may include being able to estimate distortion caused by speaker overdriving so that the echo can be cancelled effectively, e.g., less echo residual. Since the reference signal can also include speaker distortion which in turn may be same as the coupled signal, this can allow echo cancelling to converge faster and the echo path to be modeled rapidly to provide rapid echo cancellation and full duplex performance.

Advantages of the echo cancelling systems and methods may include no need for special modification on acoustics, no special tuning step required by the customer, and no complex echo cancelling algorithm may need to be used for modeling non-linearity, such as those caused by overdriving loudspeakers and power amplifiers. Therefore, there may not be a need to return phones from the customer for tuning. This can reduce production time by several weeks. In some cases, the systems and methods can be used with existing echo cancelling algorithms and any additional acoustics modifications may not be required. A linear echo cancelling algorithm used with these systems and methods my act as non-linear echo cancelling with little or no modification. If the CODEC chip already includes an extra, unused analog to digital converter and registers, the systems and methods may require minimum additional hardware costs to implement.

The systems and methods can provide for automatic tuning of the AEC; reduced development time; reduced software processing time (MIPS) which otherwise may be required to model non-liner distortion; and differentiators in a quality of products regardless of the loudspeaker or earpiece receiver type or acoustic model. With the echo reference signal being fed to the AEC, the AEC can account for loudspeaker distortion prior to sending a signal to the speech coder. The echo reference signal can have knowledge of echo path distortion and as a result can provide echo reduction such as for less expensive or smaller devices, or devices with poorly designed acoustics. This can result in improved double talk performance, such as due to speaker distortion, including distortion from less expensive loudspeakers or poorly designed loudspeaker cavities and low cost handsets.

The systems, methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A telecommunications system for a speakerphone, comprising:
   a loudspeaker to output downlink signals received from a network;
   a loudspeaker driver connected with the loudspeaker, the loudspeaker driver to drive the output of the loudspeaker;
   a microphone to receive inputted signals at the microphone, the inputted signals including non-linear distortion received from the loudspeaker;
   an echo canceller connected with the microphone, the echo canceller to receive the inputted signals; and
   an amplifier connected between the loudspeaker driver and the loudspeaker, the amplifier to send to the echo canceller an echo reference signal representing the non-linear distortion, the echo canceller to cancel at least some of the non-linear distortion received at the microphone based on the echo reference signal, wherein said at least some of the non-linear distortion is generated by the loudspeaker.

2. The system of claim 1 further including a pre-distortion filter connected with the echo canceller, the pre-distortion filter to send a pre-distortion signal to the echo canceller to aid with non-linear distortion cancellation.

3. The system of claim 2 where the pre-distortion filter receives the echo reference signal, the downlink signals and the microphone inputted signals to provide the pre-distortion signal.

4. The system of claim 2 where the pre-distortion filter comprises an adaptive filter.

5. The system of claim 1 where the amplifier comprises a programmable gain amplifier.

6. The system of claim 1 further including a resistor ladder connected to the loudspeaker and the amplifier, the ladder to provide variable resistance to the amplifier.

7. The system of claim 1 further including an analog-to-digital converter, where the echo reference signal is converted to a digital signal by the analog-to-digital converter before being sent to the echo canceller.

8. The system of claim 1, wherein the non-linear distortion is related to characteristics of the speaker, including signal drive level of the loudspeaker.

9. A telecommunication system including a speakerphone, comprising:
   a coupled signal path to accommodate an incoming audio signal and an echo signal combining to form a coupled signal, the echo signal including non-linear distortion generated by a speaker of the speakerphone;
   an echo signal path to accommodate an echo reference signal, the echo reference signal including the non-linear distortion; and
   an echo canceller configured to receive the coupled signal from the coupled signal path and the echo reference signal from the echo signal path, and to cancel out at least some of the non-linear distortion included in the coupled signal based on the non-linear distortion included in the echo reference signal, wherein said at least some of the non-linear distortion is generated by the speaker of the speakerphone.

10. The system according to claim 9, where the echo canceller cancels out the non-linear distortion by subtracting the non-linear distortion included in the echo reference signal from the non-linear distortion included in the coupled signal.

11. The system according to claim 10, where the subtracting includes at least one of introducing a delay in at least a part of the echo reference signal, inverting a phase of the echo reference signal, and regulating an amplitude of the echo reference signal.

12. The system of claim 9, where the non-linear distortion is related to characteristics of the speaker, including signal drive level of the speaker.

13. The system of claim 9 where the echo signal path connects the speaker with the echo canceller and the coupled signal path connects a microphone with the echo canceller.

14. The system of claim 13 where the microphone receives an acoustic echo signal from the speaker.

15. The system of claim 14 where the acoustic echo signal and the echo reference signal are closely correlated to each other.

16. A method for canceling out non-linear distortion in a telecommunication system, the method comprising:
   generating, at a microphone, a coupled signal including uplink information and non-linear distortion;
   generating, with a programmable gain amplifier connected between a speaker driver and a speaker, an echo reference signal, the echo reference signal including non-linear distortion;
   receiving, at an acoustic echo canceller, the coupled signal from the microphone and the echo reference signal from the speaker; and
   cancelling out, at the acoustic echo canceller, at least some of the non-linear distortion included in the coupled signal based on the non-linear distortion included in the echo reference signal, wherein said at least some of the non-linear distortion is generated by the speaker;
   where the cancelling out the non-linear distortion includes subtracting, in the acoustic echo canceller, the non-linear distortion included in the echo reference signal from the non-linear distortion included in the coupled signal.

17. The method according to claim 16, where the generating the coupled signal and the generating the reference signal are performed in a speaker phone mode.

18. The method according to claim 16, where the cancelling out the non-linear distortion includes subtracting, in the acoustic echo canceller, the non-linear distortion included in the echo reference signal from the non-linear distortion included in the coupled signal.

19. The method according to claim 18, wherein the subtracting includes at least one of introducing a delay in at least a part of the echo reference signal, inverting a phase of the echo reference signal, and regulating an amplitude of the echo reference signal.

* * * * *